United States Patent [19]

Sandweg

[11] Patent Number: 5,033,448
[45] Date of Patent: Jul. 23, 1991

[54] BARBECUE GRILL SUPPORT FRAME

[76] Inventor: James Sandweg, 998 Piedras Pkwy., Fenton, Mo. 63126

[21] Appl. No.: 406,075

[22] Filed: Sep. 12, 1989

[51] Int. Cl.⁵ .............................................. A47J 37/00
[52] U.S. Cl. .................................... 126/25 R; 126/30; 126/50
[58] Field of Search ............... 126/2.5 R, 24, 30, 9 R, 126/29, 26, 38, 50; 248/214

[56] References Cited

U.S. PATENT DOCUMENTS

| | | | |
|---|---|---|---|
| 2,768,042 | 10/1956 | Persinger et al. | 126/332 X |
| 2,780,474 | 2/1957 | Farah et al. | 126/25 R X |
| 3,032,783 | 5/1962 | Swanson, Jr. | 126/24 X |
| 4,635,613 | 1/1987 | Tucker et al. | 126/25 R |
| 4,688,541 | 8/1987 | Stephen et al. | 126/25 R |

FOREIGN PATENT DOCUMENTS 80152  8/1918  Switzerland ........................... 126/30

*Primary Examiner*—Larry Jones
*Attorney, Agent, or Firm*—Cohn, Powell & Hind

[57] ABSTRACT

A barbecue grill support frame (1) is provided for mounting onto upper and lower support rails (U, L). An upper frame (3) includes elongate side members (5A, 5B) each of which has a hook shaped inner end (7A, 7B) for attaching the side members to the upper rail and a transverse frame (9) attached to the side members at opposite points. A pair of elongate inclined telescopically adjustable leg members (15A, 15B) are pivotally attached to the side members and brackets (27A, 27B) carried by the lower support rail are pivotally connected to one end of an associated leg member. Auxiliary side panels (31A, 31B) are attachable to each side of the upper frame. In one embodiment the transverse frame includes an elongate member (11) and a circular member (13) and in another embodiment the transverse frame includes a pair of elongate transverse members (111, 113).

16 Claims, 4 Drawing Sheets

U.S. Patent July 23, 1991 Sheet 1 of 4 5,033,448
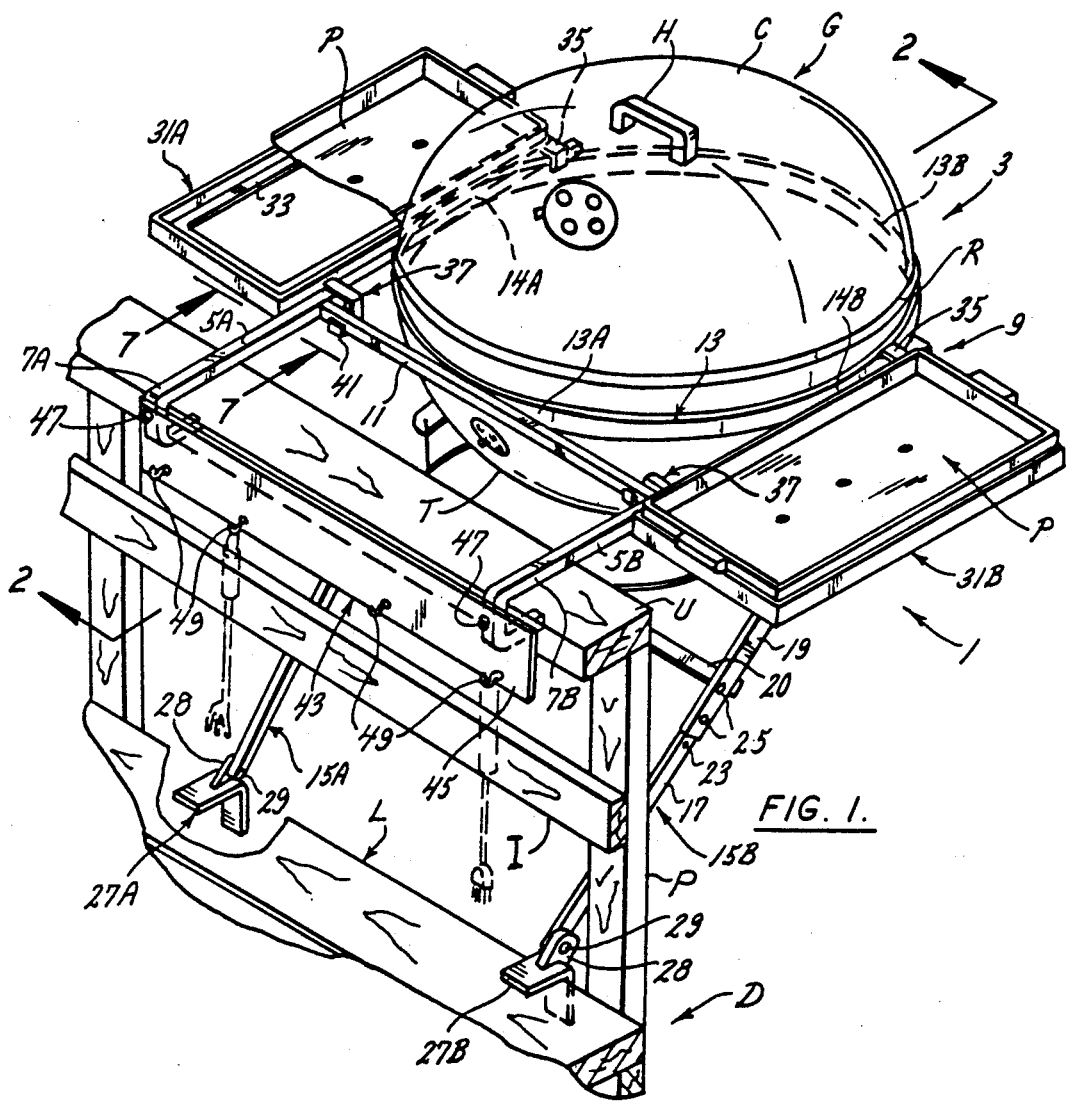
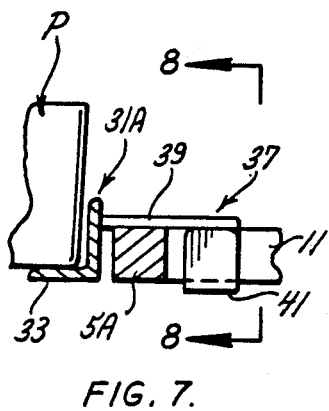
FIG. 7.
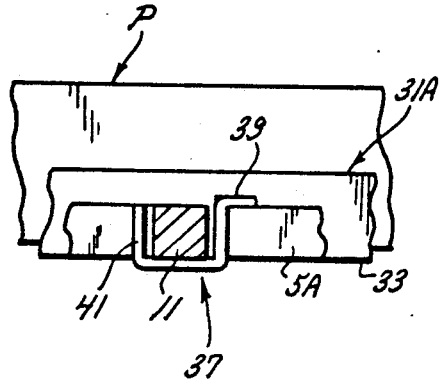
FIG. 8.

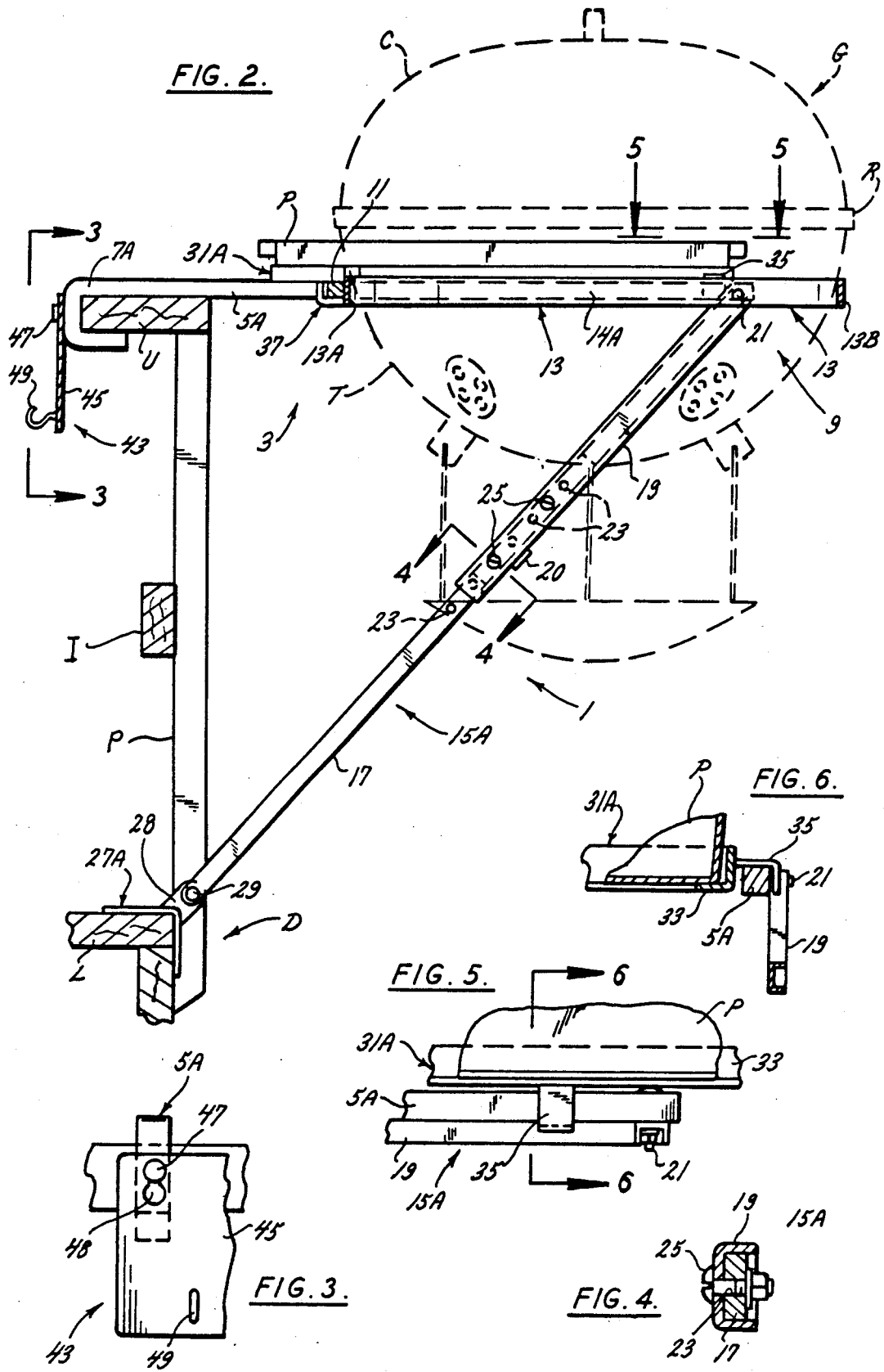

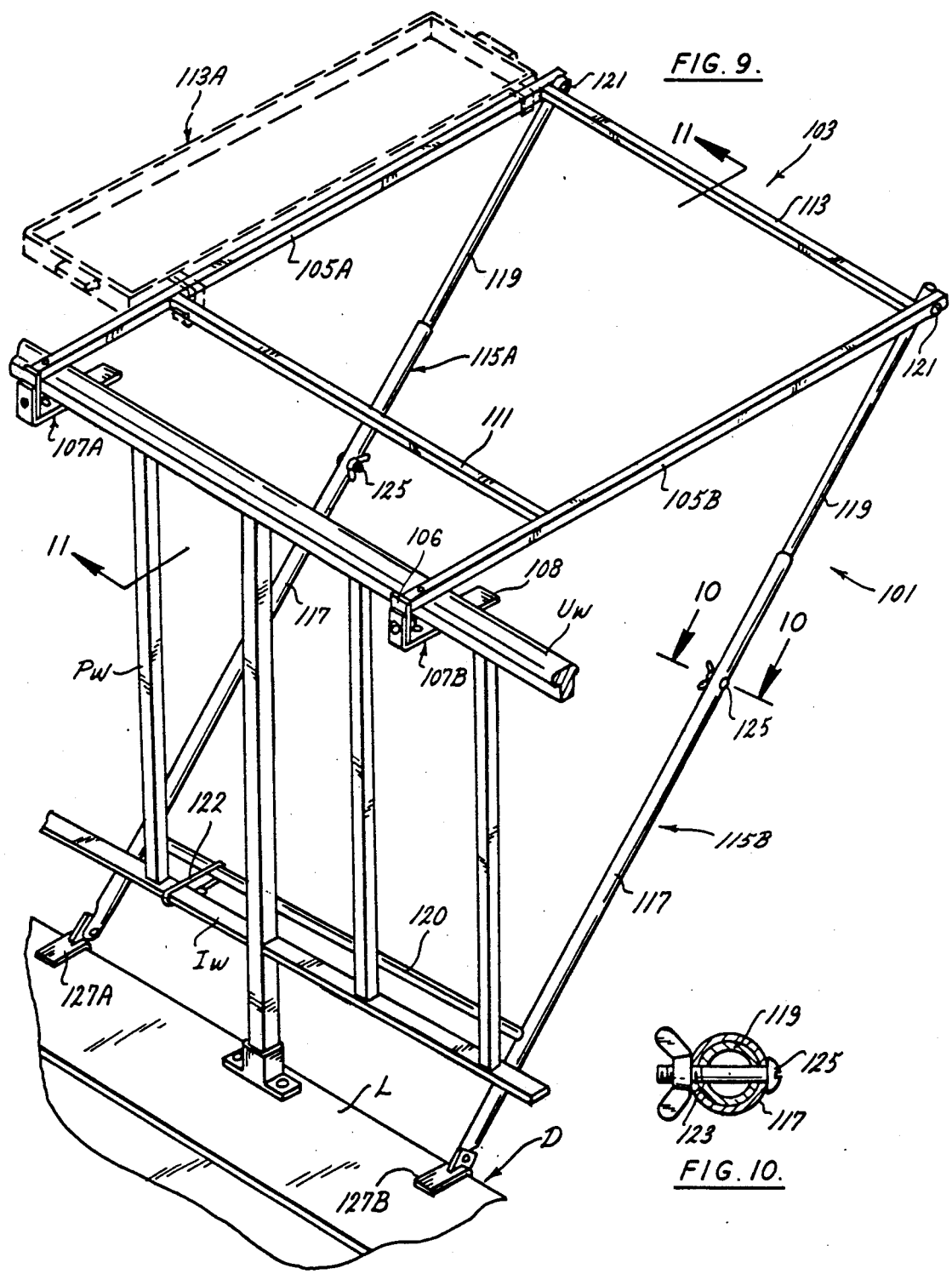

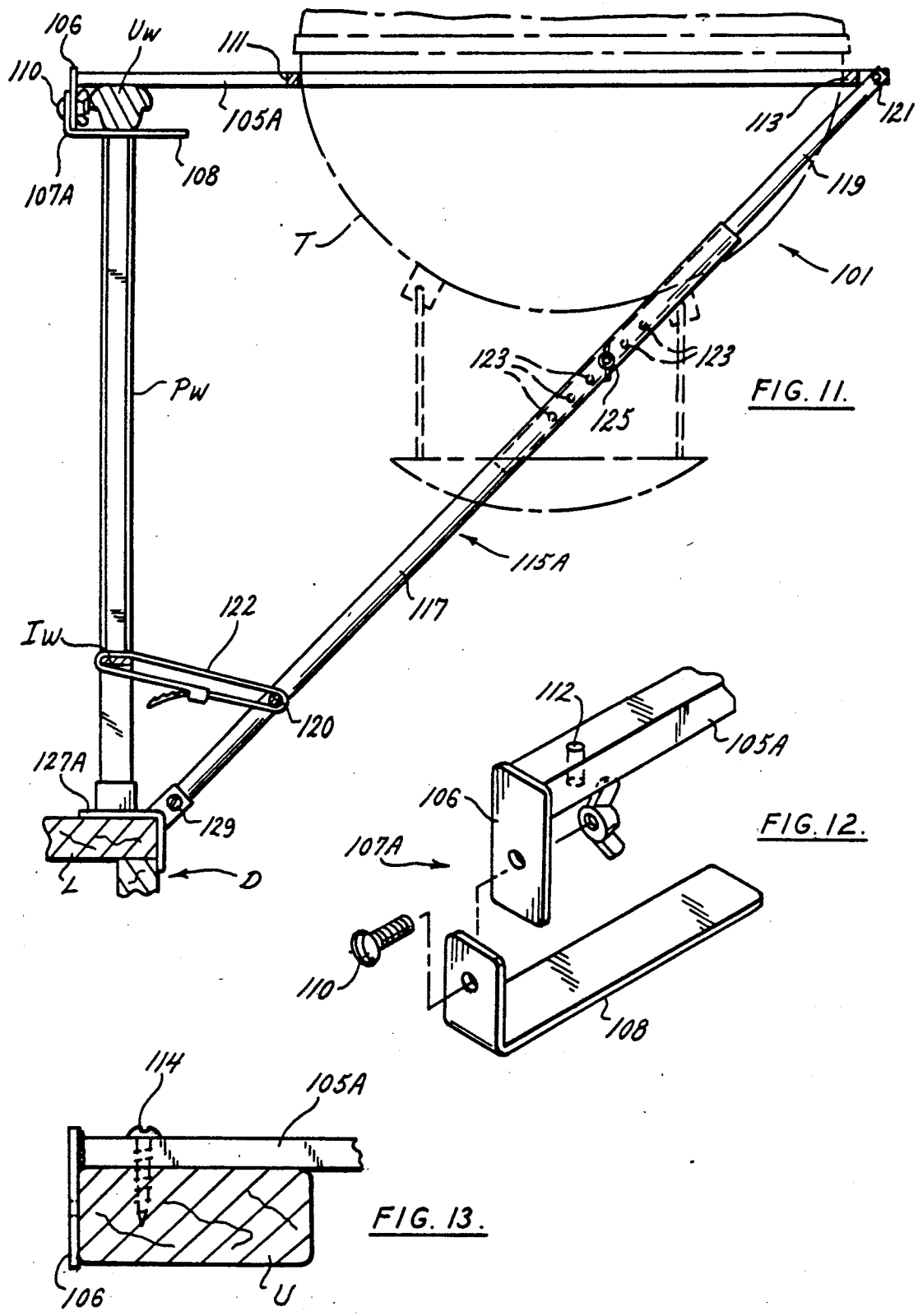

1

BARBECUE GRILL SUPPORT FRAME

BACKGROUND OF THE INVENTION

This invention relates to outdoor cooking equipment and, in particular, to a support frame for a barbecue grill.

Barbecuing has been an increasingly popular outdoor activity for many years and will continue to be so. In suburban and rural areas with spacious outdoor areas, there is ample room for a barbecue grill with plenty of space for people to move around and avoid contact with the grill.

In urban areas such as cities, or in complexes such as condominiums where personal or backyard spaces are limited, use of a barbecue grill of any size restricts the space available for sitting, eating, playing or other activities. Also, the use of a barbecue grill in a limited space, for example, a patio deck, increases the probability of inadvertent contact with the grill.

SUMMARY OF THE INVENTION

Among the several objects of the present invention may be noted the provision of a barbecue grill support frame; the provision of such a frame which is capable of mounting on the support rails of a patio deck, the provision of such a frame for mounting the barbecue grill outside of the deck so as to make more deck space available for other activities and to prevent contact of people with the grill while in use; and, the provision of such a frame which is easy to install and which adequately supports the grill.

It is an aspect of the invention to provide a barbecue grill support frame for mounting the grill onto the upper and lower side support members on a deck or similar structure, the support frame including an upper frame including a pair of elongate side members having an inner end and an outer end, said inner end including hook means adapted to be attached to the upper support rail, transverse framing means fixedly attached between said side members, a pair of elongate inclined telescopically adjustable leg members each having an upper end and a lower end said upper end being pivotally attached to an associated upper frame, and bracket means adapted to be carried by the lower support rail and being pivotally attached to the lower ends of said adjustable leg members.

It is another aspect of this invention to provide that the transverse framing means includes a pair of elongate transverse members fixedly attached between said side members.

It is still another aspect of this invention to provide that one of said transverse members is disposed intermediate the ends of said side members and the other of said transverse members is disposed adjacent the outer ends of said side members.

It is yet another aspect of this invention to provide that the transverse framing means includes a substantially circular member fixedly attached to said side members at diametrically opposite points.

In one aspect of this invention an elongate transverse member is attached intermediate the ends of said side members, and said circular member includes an arcuate inner portion and an arcuate outer portion, said inner portion being fixedly attached to said transverse member, said outer portion extending beyond the outer end of said side members.

In another aspect of this invention each telescopic support member consists of two portions, one portion nesting within the other portion, and fastener means adjustably connecting said nested portions.

In still another aspect of this invention each bracket means is substantially L-shaped and includes a lug providing part of said pivotal attachment to said adjustable leg members.

In yet another aspect of this invention there is a side panel member which is removably attached to the outside of at least one of said elongate side members.

Another aspect of this invention to provide that said side panel member is removably attached by means of two connectors, the first connector being an L-shaped member that fits over said side member, and the second connector extending laterally outward from said side panel member and being adapted to be carried by the upper edge of said elongate side member, and having a U-shaped portion which is attached underneath one of said transverse members.

Still another aspect of this invention is to provide that said side panel member consists of an open frame.

In one aspect of this invention a cross brace is disposed between the telescopic framing members at the lower end of said members, and a flexible tie operatively connects said cross brace to said lower support member.

In another aspect of this invention the hook means of said upper frame side members are formed from a vertical plate and a detachable L-shaped plate, and said outer ends of said side members include a screw-receiving opening to facilitate attachment of said members to a wood support member.

In still another aspect of this invention said upper frame outer transverse member is spaced from the outer ends of said side members, and said telescopic members are pivoted to associated side members outwardly of said transverse member.

It is an aspect of this invention to provide a barbeque grill support frame which is inexpensive to manufacture, easy to install and effective in operation.

Other objects and features will be in part apparent and in part pointed out hereinafter.

BRIEF DESCRIPTION OF THE DRAWINGS

FIG. 1 is a perspective view of a barbecue grill support frame of the present invention;

FIG. 2 is a side sectional view of the support frame taken along line 2—2 in FIG. 1;

FIG. 3 is a front elevational view of a portion of a cooking utensil holder;

FIG. 4 is a sectional view of a connecting bolt for a telescoping side member of the frame taken along line 4—4 in FIG. 2;

FIG. 5 is a partial top plan view of a side panel taken along line 5—5 in FIG. 2;

FIG. 6 is a sectional view taken along line 6—6 in FIG. 5;

FIG. 7 is a front elevational view of a side panel attachment structure taken along line 7—7 in FIG. 1; and FIG. 8 is a side elevational view of the attachment structure taken along line 8—8 in FIG. 7.

FIG. 9 is a perspective view of a barbecue grill support frame of an alternative embodiment adapted for wrought iron railing;

FIG. 10 is a sectional view of a connecting bolt for a telescoping side member taken along line 10—10 in FIG. 9;

FIG. 11 is a sectional view of the support frame of FIG. 9 taken along line 11—11 in FIG. 9;

FIG. 12 is an exploded perspective view of the connecting means for attachment of said support frame; and FIG. 13 is a side view of an L-shaped end of a support member showing said support frame attached to a wood porch rail.

Corresponding reference characters indicate corresponding parts throughout the several views of the drawings.

DESCRIPTION OF THE PREFERRED EMBODIMENT

Referring now by reference numerals to the drawings, and first to FIGS. 1–8, a barbecue grill support frame is indicated generally by numeral 1 and is for use with a barbecue grill G having a lower tub portion T and a top cover C. The top cover has a handle H for installing and removing the top cover. Support frame 1 is for mounting to upper and lower support rail members, U and L, respectively, of a deck D and posts P interconnected by an intermediate rail member I.

The support frame 1 includes an upper frame 3 including a pair of elongate side members 5A and 5B respectively. As shown in FIG. 1, side members 5A and 5B are spaced apart a distance substantially equal to the outer diameter of the tub portion of the grill G and extend outwardly from upper support rail U. The side members have an inner end and an outer end, the inner end of each side member being formed into a hook end, 7A and 7B respectively, which hooks over the inner end of the support rail U for attaching the side members to said upper support rail.

Support frame 1 also includes a transverse framing means 9 which includes an intermediate transverse member 11 extending between the respective inner faces of side members 5A and 5B and fixedly attached to said members. Transverse member 11 is positioned approximately one third along the length of the side members. The framing means 9 also includes a circular member 13 which is fixedly attached, as by welding, to the side members 5A and 5B at diametrically opposite points indicated by 14A and 14B. Member 13 includes an arcuate inner portion 13A which is attached to the transverse member 11 at the mid-point of said member. The member 13 further has an outer arcuate portion 13B which extends beyond the outer end of the side members 5A and 5B. The inner diameter of member 13 is substantially equal to the diameter of tub T for the tub to fit into the member. Typically, the upper circumference of the tub is outwardly turned to form a lip or rim R against which the cover seats. The tub rests in the circular member so the upper end of the tub is disposed somewhat above said circular member, thus to facilitate easy access to the grill portion of the tub.

The support frame 1 next includes a pair of elongate, inclined, telescopically adjustable leg members 15A and 15B respectively. Each leg has an upper portion 19 and a lower portion 17, and one end of each upper portion 19 is pivotally fastened to its associated side rail 5A or 5B by a pin 21. The upper portion 19 of the leg member is U-shaped to allow the lower portion 17 of the member to telescopically fit nestingly therewithin. A cross brace 20 is fixedly attached between said portions 19, as by welding, to stiffen said portions by forming them into an H-frame, and a keep plate 22 is attached, as by welding, between the toes of the U-shaped portion at the end thereof. The lower end of each upper portion 19 has a plurality of holes 23 and there are corresponding holes formed in the end of the upper portion 17. Fasteners 25, comprising a nut and bolt, are used to connect the upper and lower portions together to support upper frame 3. The lower end of each portion 17 is pivotally connected to an associated L-shaped bracket member, 27A and 27B, respectively, by a pin 29, each bracket having an outstanding apertured lug 28 for this purpose. The bracket members are each in an inverted position so to fit on lower support rail L.

The support frame 1 further includes open frame side panel members 31A and 31B respectively, which are removably attachable to side members 5A and 5B. The side panels are each rectangular in shape with a hollow center in which a pan P for meat or condiments can be fitted. As shown in FIG. 1, a circumferential lip 33 is formed on the lower portion of each panel to support the pan. Each panel is removably attached to its associated side member by means of two connectors. A first connector 35, best shown in FIGS. 5 and 6, comprises an L-shaped member which fits over the side member as shown in FIGS. 1 and 6. A second connector 37 has a flat portion 39 which extends laterally outward from the side panel and rests on the upper edge of each side member and a U-shaped portion 41 which abuts the outer face of transverse member 11 and extends underneath the member and up its front face. This double connection holding action serves to lock the side panels in place and prevent slippage.

A utensil holder 43 comprises a rectangular panel 45 which is secured to the outer faces 7A and 7B of the side members by stud connectors 47 which are received in slots 48. One or more hooks 49 extend from the face of panel for utensils to be hung from.

An alternative embodiment of the support frame indicated by numeral 101 is shown in FIGS. 9–13 which is used in conjunction with a wrought iron rail system having an upper rail member Uw, an intermediate rail member Iw and posts Pw bolted to lower rail member Lw of said patio deck D. In the alternative embodiment similar components of the support frame 101 are indicated by the same numerals as described above with the addition of suffix 100.

The support frame 101 includes an upper frame 103 including a pair of elongate side members 105A and 105B respectively. Hooked ends 107A and 107B, as clearly shown in FIGS. 11 and 12 are formed from a vertical member 106, attached to an associated side member such as 105A as by welding, and an L-shaped member 108 which is attached to said member by means of a wing nut fastener 110. The side member 105A also includes an opening 112 so that the member 105A can be optionally connected to a wood rail U, in lieu of the wrought iron rail Uw, as shown in FIG. 13 by a screw 114.

Support frame 101 also includes a transverse framing means which includes a pair of transverse members 111 and 113 fixedly attached between members 105A and 107A. Member 113 is disposed adjacent the outer end of the side members and spaced from member 111 substantially the same distance as the side members are spaced from each other so that the tub T of the barbeque grill is supported at four points.

The telescopically adjustable leg members 115A and 115B of support frame 101, each include a tubular upper portion 119 and a larger diameter tubular lower portion 117 which receives the upper portion 119 in sliding relation. The upper end of each upper portion 119 is flattened and pivotally fastened to its associated side rail as by a pin 121, such as a wing nut fastener. As shown in FIG. 13, the upper and lower portions are connected by a wing nut fastener 125 extending through an opening 123 provided in the lower portion 117 and one of a plurality of corresponding openings provided in the lower end of said upper portion 119. The lower portion 117 is flattened and pivotally connected to a bracket 127A, substantially as described above with respect to support frame 1 and a cross brace 120 is fixedly attached between said lower portions 117, as by welding, to form an H-frame. In the embodiment shown an additional connection for the support frame 101 is provided by an adjustable flexible tie strap 122 of plastic or the like which extends between cross brace 120 and the intermediate rail Iw and thereby operatively to said lower support member L of the deck D.

As shown in phantom outline in FIG. 9 a side panel member 131A can be removably attached to the outside of associated side members 105A, the manner of attachment being substantially as described above with respect to support frame 1.

In view of the above it will be understood that various aspects and features of the invention are achieved and other advantageous results are attained. While preferred embodiments of the invention have been shown and described, it will be clear to those skilled in the art that various modifications may be made without departing from the invention in its broader aspect.

I claim as my invention:

1. A barbeque grill support frame for mounting onto upper and lower support members, the frame comprising:
   (a) an upper frame including:
      1. a pair of elongate side members having an inner end and an outer end, said inner end including hook means adapted to be attached to the upper support member,
      2. transverse framing means fixedly attached between said side members,
   (b) a pair of elongate inclined telescopically adjustable leg members each having an upper end and a lower end said upper end being pivotally attached to the upper frame, and
   (c) bracket means adapted to be carried by the lower support member and being pivotally attached to the lower ends of said adjustable leg members.

2. A barbeque grill support frame according to claim 1, wherein:
   (d) the transverse framing means includes a pair of elongate transverse members fixedly attached between said side members.

3. A barbeque grill support frame according to claim 2, wherein:
   (e) one of said transverse members is disposed intermediate the ends of said side members and the other of said transverse members is disposed adjacent the outer ends of said side members.

4. A barbeque grill support frame according to claim 2, wherein:
   (e) there is a side panel member which is removably attached to the outside of at least one of said elongate side members.

5. A barbeque grill support frame according to claim 4, wherein:
   (f) said side panel member is removably attached by means of two connectors, the first connector being an L-shaped member that fits over said side member, and the second connector extending laterally outward from said side panel member and being adapted to be carried by the upper edge of said elongate side member, and a U-shaped portion which is attached underneath one of said transverse members.

6. A barbeque grill support frame according to claim 5, wherein:
   (g) said side panel member consists of an open frame.

7. A barbeque grill support frame according to claim 1, wherein:
   (d) the transverse framing means includes a substantially circular member fixedly attached to said side members at diametrically opposite points.

8. A barbeque grill support frame according to claim 7, wherein:
   (e) an elongate transverse member is attached intermediate the ends of said side members, and
   (f) said circular member includes an arcuate inner portion and an arcuate outer portion, said inner portion being fixedly attached to said transverse member; said outer portion extending beyond the outer end of said side members.

9. A barbeque grill support frame according to claim 1, wherein:
   (d) each telescopic support member consists of two portions, one portion nesting within the other portion, and fastener means adjustably connecting said nested portions.

10. A barbeque grill support frame according to claim 1, wherein:
    (d) each bracket means is substantially L-shaped and includes a lug providing part of said pivotal attachment to said adjustable leg members.

11. A barbeque grill support frame for mounting onto upper and lower support members, the frame comprising:
    (a) an upper frame including:
       1. a pair of elongate side members having an inner end and an outer end, said inner end including hook means adapted to be attached to the upper support member,
       2. framing means including a pair of transverse members fixedly attached between said side members, one of said members being attached intermediate the ends of said side members and the other of said members being attached adjacent the outer ends of said members,
    (b) a pair of elongate inclined telescopically adjustable leg support members having upper end and a lower end said upper end being pivotally attached to said outer end of an associated side member outwardly of said outer transverse member, each telescopic support members consisting of upper and lower portions, the one portion nesting within the other portion and being connected to said other portion fastener means and a cross brace being fixedly attached between said other portions,
    (c) bracket means adapted to be carried by the lower support member and being pivotally attached to the lower ends of said adjustable leg members, each bracket means being substantially L-shaped and includes a lug providing part of said pivotal attachment to said adjustable leg members, and
    (d) an open frame side panel member removably attached to the outside of each elongate side member by means of two connectors, the first connector being an L-shaped member that fits over said side panel member, the second connector extending laterally outward from said side panel and being adapted to be carried by the upper edge of said elongate side member and including a U-shaped portion which attaches underneath said intermediate transverse member.

12. A barbecue grill support frame according to claim 11, wherein:
   (e) the cross brace of the telescopic framing members is disposed at the lower end of said members, and
   (f) a flexible tie operatively connects said cross brace to said lower support member.

13. A barbecue grill support frame according to claim 11, wherein:
   (e) the hook means of said upper frame side members are formed from a vertical plate and a detachable L-shaped plate, and
   (f) said outer ends of said side members include a screw-receiving opening to facilitate attachment of said members to a wood rail.

14. A barbecue grill support frame according to claim 11, wherein:
   (e) said upper frame outer transverse member is spaced from the outer ends of said side members, and
   (f) said telescopic members are pivoted to associated side members outwardly of said transverse member.

15. In combination (1) a deck or similar structure having upper and lower support members, and (2) a barbeque grill support for mounting onto said structure comprising:
   (a) a frame including an inner end and an outer end,
   (b) a pair of members integral with said inner end including hook means adapted to be attached to the upper support member,
   (c) a pair of inclined leg members each pivotally attached to the outer frame end, and
   (d) means on the lower ends of said leg members adapted to anchor the leg members on the lower support member to carry part of the load of the grill frame.

16. A barbeque grill support according to claim 1 wherein:
   (e) the upper support member is a deck rail, the lower support member is a deck floor and the inclined leg members are adjustable.

* * * * *